May 15, 1934. C. A. BIRCH-FIELD 1,958,606
TELEVISION METHOD AND APPARATUS
Filed July 22, 1932

Patented May 15, 1934

1,958,606

UNITED STATES PATENT OFFICE 1,958,606

TELEVISION METHOD AND APPARATUS

Charles A. Birch-Field, Larchmont, N. Y.

Application July 22, 1932, Serial No. 624,066

9 Claims. (Cl. 178—6)

My invention relates to the transmission and reception of light patterns, pictures and the like, in which in contradistinction to present methods employing cathode rays or mechanical moving parts for scanning purposes, this system employs the following well known principles in a novel combination, viz:

1. The principles of rotation of the plane of polarized light in an electromagnetic field.
2. The principles of rotation of the plane of polarized light in its passage through certain transparent substances, in particular quartz crystals.
3. The principles of conical refraction of light in certain crystals.
4. The principles of optics, as exhibited by certain types of lenses.

Further this system enjoys the distinction of being inexpensive in cost of raw materials and in manufacturing, is compact, and when once set up and adjusted requires a minimum of servicing, and in operation does not require a specialized technical knowledge on the part of the operator.

I have illustrated an embodiment of my invention in the drawing wherein—

Figure 1:
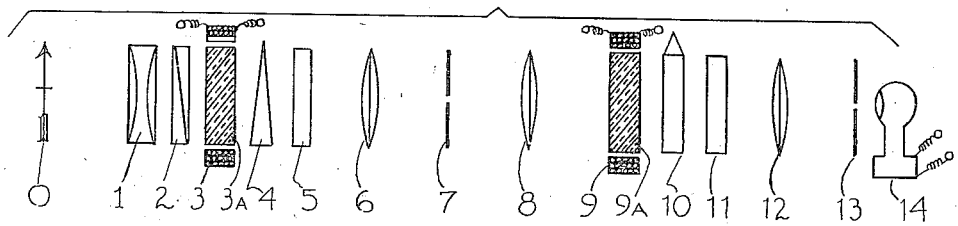
Figure 1 is a diagrammatic layout of a television transmission system embodying the invention.

A description of the apparatus employed, together with a description of the functions of the component parts is as follows:

The numerals refer to the numerals in Figure 1 of the drawing.

1. Lens system to gather and render parallel light rays from object to be transmitted.
2. Polarizer to polarize rays in desired plane.
3 and 3A. Means for rotating the plane of the rays through a desired range repeatedly and regularly.

While this rotation may be accomplished by mechanical rotation of the polarizer, I prefer to use electrical means, such as the rotation of the plane of polarization by projecting parallel plane polarized light rays through a refracting substance in an electromagnetic or an electrostatic field. I prefer to actuate these fields by the use of an alternating or pulsating electric current of a frequency determined by the number of pictures it is desired to transmit in a given time period and of a strength necessary to rotate the plane of polarization of the light rays through the desired range.

4. Means for further rotating the plane of the rays variably in groups of lines or other desired forms.

I prefer to use for this purpose a wedged shaped prism of quartz, as quartz possesses the power of rotating the plane of polarized light transmitted in proportion to the thickness of the quartz. The wedge shape therefore will variably rotate the plane of polarized light passing through it, in lines, consisting of rays of like polarity, the lines nearest the thinnest edge of the wedge being rotated least, the lines nearest the thickest edge being rotated most, the lines occupying the positions between being rotated variously and in gradually greater degree from thinnest to thickest edge of the wedge.

Figure 2:
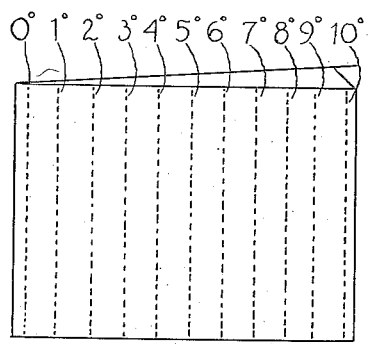
Figures 2 and 3 are diagrammatic layouts showing the variation in polarity produced by the quartz wedge included in the invention.

With a certain original plane of polarity, the rays passing from the polarizer through the quartz wedge will emerge from the wedge as a series of lines of rays, the lines differing in planes of polarity, an example being shown diagrammatically in Figure 2 of the drawing.

Figure 3:
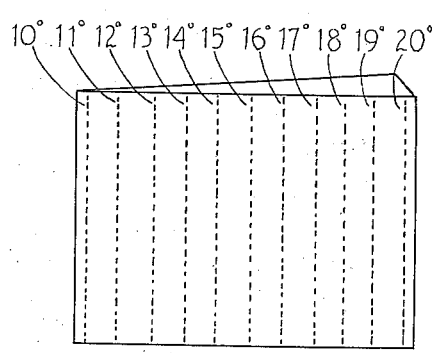
Figure 4:
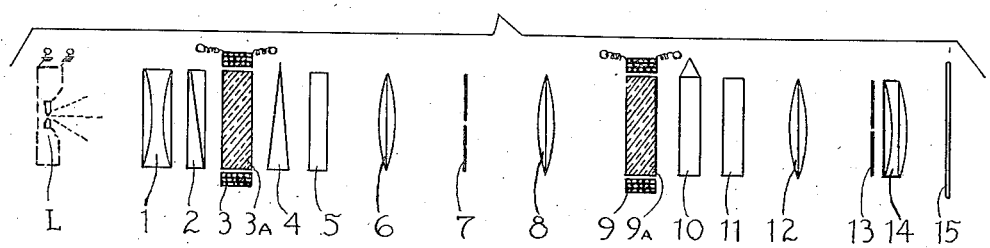
Figure 4 is a diagrammatic layout of a television receiving system embodying the invention.

The various planes of polarity will remain constant as regards their position until the original plane is rotated, when the plane of polarity of every line of rays will be altered by the exact amount of the rotation of the original plane, and, as the original plane is rotated gradually the planes of the lines of rays emergent from the wedge will be rotated gradually. It is obvious then that if the original plane is rotated through a range of ten degrees, each line will be rotated through a like range. If, at the beginning of rotation of the original plane, the line of rays emergent from the position adjacent to the thickest edge of the wedge is plane polarized at an angle of 10 degrees, then at the end of the 10 degree rotation of the original plane, the lines of emergent rays will be polarized in the planes as shown at Figure 3, which shows the line of rays adjacent to the thinnest edge of the wedge at 10 degrees.

During the rotation of the original plane from 0 degrees to 10 degrees each of the lines have, in sequence, beginning at the lines nearest to the thickest part of the wedge, assumed the 10 degree plane of polarization, each being rotated in sequence beyond this planal angle as the rotation of the original plane is gradually increased.

It is obvious that the position of the line of 10 degree polarity will move across the face of the wedge once during each rotation of the original plane through the range, and if the rotation of the original plane be actuated by an alternating or pulsating current, the movement of the lines of 10 degree polarity across the face of the wedge will be repeated once for each pulsation of the current.

5. Analyzer, to transmit groups of rays of light of a certain desired polarity plane, and occlude rays of all other polarity planes.

I prefer to use for this purpose an application of the principles of conical refraction as this allows of a greater precision in analysis.

As is well known to those versed in crystallography certain crystals possess the quality or power of refracting differently polarized rays of light in different degree.

I therefore project the rays emerging from the quartz wedge through such a crystal, the emergent face of the crystal being cut so as to maintain externally and increase the varied internal refraction of the rays of differing planes of polarization, and so that all rays of like plane of polarization will emerge as a system of parallel rays, while all rays of different planes will emerge in directions differing from each other.

In the path of a selected group of parallel rays, with its axis centered therein and parallel thereto I position a focussing lens system, 6, which focusses all of the parallel group of rays to a common focal point. In the focal plane I place a shield, 7, with an orifice at the focal point. The orifice allows all of the group of parallel rays focussed therein to pass, the shield occluding all other rays.

Thus only such rays as are polarized in the plane desired are allowed to pass beyond the shield, and, as has been described, all of the lines emerging from the quartz wedge assume, at different times and in sequence a certain desired plane of polarity, these lines will be allowed to pass through the orifice only during the time they remain in the desired plane, being occluded at all other times.

It is therefore obvious that during each rotation of the original plane of polarity all of the lines of rays will in sequence pass through the analyzer, thus accomplishing a scanning of the entire light pattern in lines, once during each pulsation of the current actuating the rotation of the original plane. The fineness of detail of this linear scanning is determined by the focal length of the focussing lens and the size of the orifice in the shield. Detail is thus adjustable to meet requirements.

After the rays emerge from the orifice in the shield in divergent paths, I pass them through a lens system, 8, to restore them to parallelism for the next step.

9 and 9A. Means for further rotating the plane of polarization, intermittently and regularly, of the groups of light rays after they pass through the analyzer.

For the purpose of scanning the lines heretofore described, I next pass them through a second rotating magnetic field, actuated by an alternating or pulsating electric current of a frequency determined by the number of units into which it is desired that the lines be divided, and of a strength necessary to rotate the plane of polarity over the desired range. It is obvious that the actuating frequency be a multiple of the frequency of the current actuating the magnetic field in the first stage where the line scanning is effected, and that the greater this second frequency the greater the number of units into which the lines will be divided.

10. Means for further rotating the polarity plane of the group of light rays variously in a series of unit components of the groups.

Following the second rotating magnetic field I position a second wedge shaped prism of quartz with its base at right angles to the base of the first quartz prism wedge so that when the line of light rays passes through this second wedge it will be so affected by the rotation produced by the wedge that the plane of polarity of the rays composing the line will vary throughout its entire length.

From the second quartz wedge I pass the rays through a second analyzer, 11, 12, 13, similar in design to the analyzer in the first stage already described. This analyzer will in like manner scan each line, allowing the component units of the line to pass through in sequence as the rotation of the plane of polarization of the units effected by the second magnetic field and the quartz wedge brings each unit of the line to the polarization plane acceptable to the analyzer, through its analytic action as heretofore described in the description of the first analyzer.

14. Means to transform light values of rays projected upon it into electric current values of similar relationship.

From the second analyzer I project the rays upon a photoelectric cell or the like the output of which is then amplified and transmitted to the receiver at a distant point by wire or wireless means of common knowledge.

The receiver is a duplicate of the transmitting apparatus just described with the following exceptions:

A fluctuating light source, controlled by the signal or output of the photoelectric cell at the transmitter is positioned at the receiver in a position before the first lens system.

The rays of light from the fluctuating light source are paralleled and passed through the receiver, which, operating in like manner to the transmitter will scan the rays from the light source, projecting the various light units from the emergent end of the receiver upon a screen instead of upon a photoelectric cell as is the case at the transmitter.

As each unit of the scanned system of light rays is projected upon the screen in its proper position, and as its tonal value is determined by the value of the light source whose fluctuation is controlled by the signal, the various units will vary in tone with the varying signal and will create a pattern which through the persistance of vision will reproduce to the observer a duplicate of the picture transmitted.

The frequencies and the values of the currents activating the two magnetic fields of the receiver are respectively the same as the frequencies and values of the currents activating the two magnetic fields at the transmitter.

Having thus described my invention and illustrated in its use, what I claim as new and desire to secure by Letters Patent is—

1. The method of line scanning a field of view which consists of converting the light from the field of view into a plurality of parallel rays, polarizing said rays, progressively rotating the plane of polarization of said rays, so that at any instant all rays have the same plane of polarization, further rotating the plane of polarization of each line of the field of view by a different amount so that each line on the picture assumes a different plane of polarization, and analyzing the light rays to allow light from each line on the field of view to fall successively on a light slit.

2. The method of line scanning a field of view which consists of converting the light from the field of view into a plurality of parallel rays, polarizing said rays, electromagnetically rotating the plane of polarization of said rays, so that at any instant all rays have the same plane of polarization, further rotating the plane of polarization of each line of the field of view by a different amount so that each line on the picture assumes a different plane of polarization, and analyzing the light rays to allow light from each line on the field of view to fall successively on a light slit.

3. The method of dividing a field of view into elementary areas which consists of converting the light from the field of view into a plurality of parallel rays, polarizing said rays, progressively rotating the plane of polarization of said rays, so that at any instant all rays have the same plane of polarization, further rotating the plane of polarization of each line of the field of view by a different amount so that each line on the picture assumes a different plane of polarization, and analyzing the light rays to allow light from each line on the field of view to fall successively on a light slit, making the rays from the slit parallel, progressively rotating the plane of polarization of the light so that at any instant all points on the line have the same plane of polarization, further rotating the plane of polarization of every point on the line by a different amount so that all points in the line have a different plane of polarization, analyzing the line of light so that each point of the line of light may fall successively on a photo-cell.

4. The method of dividing a field of view into elementary areas which consists of converting the light from the field of view into a plurality of parallel rays, polarizing said rays, electromagnetically rotating the plane of polarization of said rays, so that at any instant all rays have the same plane of polarization, further rotating the plane of polarization of each line of the field of view by a different amount so that each line on the picture assumes a different plane of polarization, and analyzing the light rays to allow light from each line on the field of view to fall successively on a light slit, making the rays from the slit parallel, electromagnetically rotating the plane of polarization of the light so that at any instant all points on the line have the same plane of polarization, further rotating the plane of polarization of every point on the line by a different amount so that all points in the line have a different plane of polarization, analyzing the line of light so that each point of the line of light may fall successively on a photo-cell.

5. In an apparatus for the electrical transmission of light patterns, pictures or the like means for making rays of light parallel, a polarizer, an electromagnetic coil with a refractive substance in its magnetic field which when activated by an alternating electric current will repeatedly and regularly rotate the plane of polarization of transmitted polarized light through a desired range and a wedge shaped quartz crystal whose variation in thickness will rotate the plane of transmitted polarized light in a desired variation increasing from least to greatest thickness of the wedge, and an analyzer which will allow light rays of desired plane of polarization to pass, occluding all rays of polarity plane other than the desired plane.

6. In an apparatus for the electrical transmission of light patterns, pictures or the like means for making rays of light parallel, a polarizer, an electromagnet coil with a refractive substance in its magnetic field which when activated by an alternating electric current will repeatedly and regularly rotate the plane of polarization of transmitted polarized light through a desired range and a wedge shaped quartz crystal whose variation in thickness will rotate the plane of transmitted polarized light in a desired variation increasing from least to greatest thickness of the wedge and an analyzer which will allow light rays of desired plane of polarization to pass, occluding all rays of polarity plane other than the desired plane, consisting of a substance with the property of differently refracting light rays of differing planes of polarity, with means for passing a desired plane of polarity and occluding all light rays of polarity plane other than the desired plane.

7. In an apparatus for the electrical transmission of light patterns, pictures or the like, means for making rays of light parallel, a polarizer, an electromagnetic coil with a refractive substance in its magnetic field which when activated by an alternating electric current will repeatedly and regularly rotate the plane of polarization of transmitted polarized light through a desired range and a wedge shaped quartz crystal whose variation in thickness will rotate the plane of transmitted polarized light in a desired variation increasing from least to greatest thickness of the wedge, and an analyzer which will allow light rays of desired plane of polarization to pass, occluding all rays of polarity plane other than the desired plane, consisting of a substance with the property of differently refracting light rays of differing plane of polarity, with a focussing lens positioned in the path into which the rays with desired polarity plane are refracted, with the axis of the lens centered in and parallel to the path, with a shield positioned in the focal plane of the focussing lens, the shield containing a transparent orifice at the focal point of the lens, and means for paralleling the diverging rays emergent from the orifice in the shield.

8. In an apparatus for the electrical transmission of light patterns, pictures or the like, means for making rays of light parallel, a polarizer, an electromagnetic coil with a refractive substance in its magnetic field which when activated by an alternating electric current will repeatedly and regularly rotate the plane of polarization of transmitted polarized light through a desired range, and a wedge shaped quartz crystal whose variation in thickness will rotate the plane of transmitted polarized light in a desired variation increasing from least to greatest thickness of the wedge and an analyzer which will allow light rays of desired plane of polarization to pass, occluding all rays of polarity plane other than the desired plane consisting of a substance with the property of differently refracting light rays of differing plane of polarity, with a focussing lens positioned in the path into which the rays with desired polarity plane are refracted, with the axis of the lens centered in and parallel to the path, with a shield positioned in the focal plane of the focussing lens, the shield containing a transparent orifice at the focal point of the lens, and means for paralleling the diverging rays emergent from the orifice in the shield, followed by a second refractive medium in an electromagnetic field, said field being activated by an alternating current of a strength necessary to rotate the plane of transmitted polarized light over a desired range, and of a frequency a high multiple of the frequency of the current activating the first electromagnetic field, followed by a second wedge shaped quartz prism, positioned with regard to the first quartz prism with the bases at right angles and the faces parallel, the second quartz prism being followed by a second analyzer of like construction to the first analyzer described herein, which is followed by a photoelectric cell for converting varying light impulses into electrical impulses of like variation.

9. In an electro-optical system, a light source, means for making rays of light from said source parallel, a polarizer, an electromagnetic coil with a refractive substance in its magnetic field which when activated by an alternating electric current will repeatedly and regularly rotate the plane of polarization of transmitted polarized light through a desired range, and a wedge shaped quartz crystal whose variation in thickness will rotate the plane of transmitted polarized light in a variation desired, increasing from the least to the greatest thickness of the wedge, and an analyzer which will allow light rays of desired plane of polarization to pass, occluding all rays of polarity plane other than the desired plane, consisting of a substance with the property of differently refracting light rays of differing plane of polarity, with a focussing lens positioned in the path into which the rays with desired polarity plane are refracted, with the axis of the lens centered in and parallel to the path, with a shield positioned in the focal plane of the focussing lens, the shield containing a transparent orifice at the focal point of the lens, and means for paralleling the diverging rays emergent from the orifice in the shield, followed by a second refracting medium in an electromagnetic field said field being activated by an alternating current of a strength necessary to rotate the plane of transmitted polarized light over a desired range, and of a frequency a high multiple of the frequency of the current activating the first electromagnetic field, followed by a second wedge shaped quartz prism, positioned with regard to the first quartz prism, with the bases at right angles and the faces parallel, the second quartz prism being followed by a second analyzer, which is of like construction to the first analyzer herein described, followed by well known optical means for projecting the emergent rays for observation of the reproduction of the transmitted light pattern or patterns.

CHARLES A. BIRCH-FIELD.